United States Patent [19]

Nelson

[11] 3,800,828
[45] Apr. 2, 1974

[54] THREE-WAY SNAP-ACTING GAS VALVE
[75] Inventor: Richard E. Nelson, Palos Verdes Peninsula, Calif.
[73] Assignee: Honeywell Inc., Minneapolis, Minn.
[22] Filed: Jan. 16, 1973
[21] Appl. No.: 324,040

[52] U.S. Cl............ 137/625, 137/625.2, 137/627.5, 236/86, 251/75
[51] Int. Cl............................................. F16k 11/02
[58] Field of Search............. 137/627.5, 625, 625.2; 251/75; 236/48, 86; 337/368

[56] References Cited
UNITED STATES PATENTS

| | | | |
|---|---|---|---|
| 3,243,022 | 3/1966 | Humphrey | 137/625.2 X |
| 2,947,319 | 8/1960 | Kaldobsky | 137/627.5 X |
| 3,263,693 | 8/1966 | Ages | 137/625.2 X |
| 3,366,140 | 1/1968 | Dunn | 137/596.17 |
| 2,825,360 | 4/1958 | Klee | 137/625.2 |
| 2,461,615 | 2/1949 | Taylor | 137/492 |
| 3,368,582 | 2/1968 | Kozel et al. | 137/549 |
| 2,320,535 | 6/1943 | Peterson | 337/368 |

FOREIGN PATENTS OR APPLICATIONS

| | | | |
|---|---|---|---|
| 943,564 | 10/1948 | France | 137/625.2 |
| 515,813 | 2/1955 | Italy | 137/627.5 |

Primary Examiner—Alan Cohan
Assistant Examiner—Gerald A. Michalsky
Attorney, Agent, or Firm—Lamont B. Koontz; Alan M. Staubly

[57] ABSTRACT

A three-way control valve for a diaphragm actuated gas valve wherein the control valve head overlies two valve seats and is supported on a cantilever tongue extending backwardly from the free end of a resilient lever and through a slot in the valve head. The tongue is inclined to the lever so as to normally engage the seat remote from the fixed end of the tongue but arranged to close and pivot about the near seat, when the free end of the lever is moved towards the seats, to open the remote seat.

5 Claims, 5 Drawing Figures

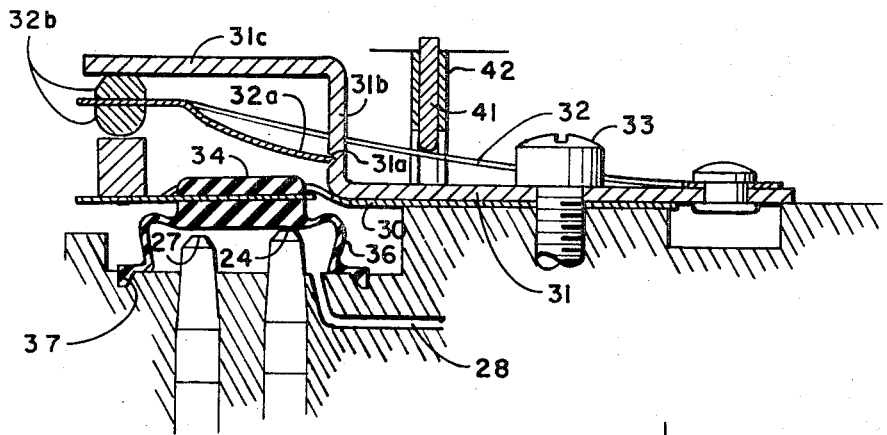
FIG. 2
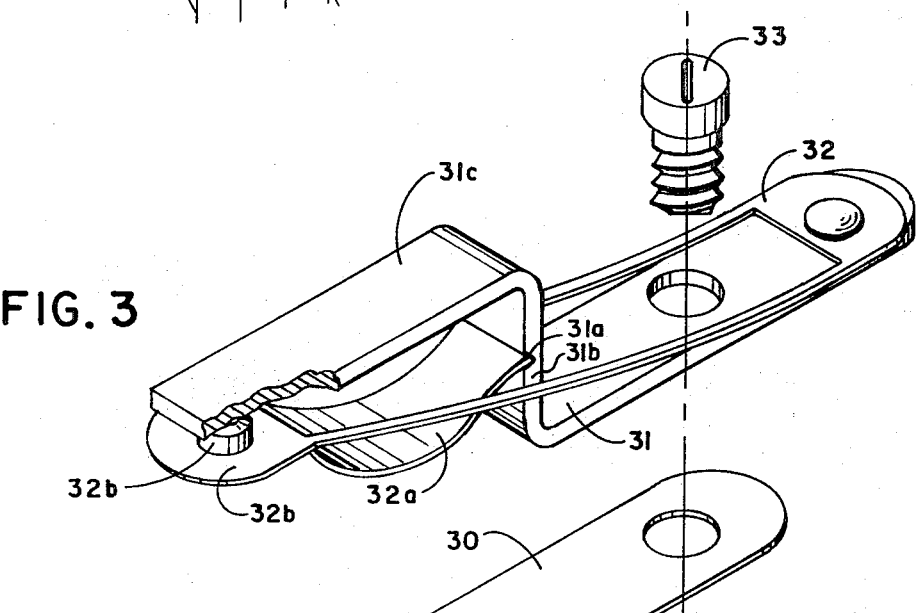
FIG. 3
FIG. 4
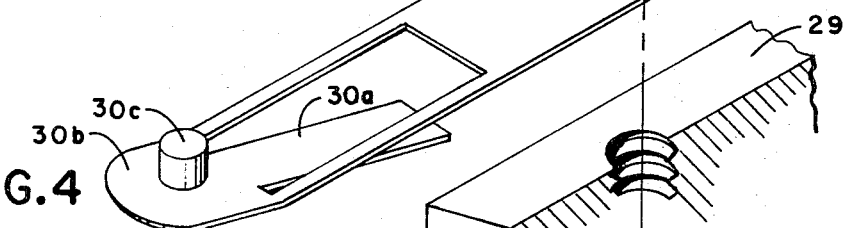
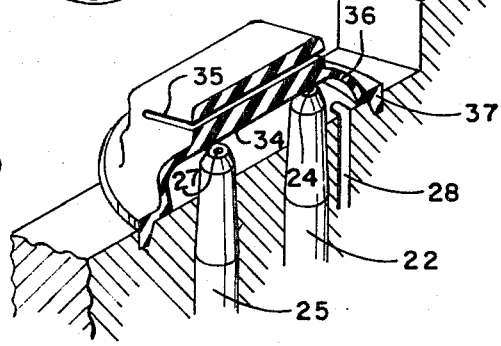
FIG. 5

THREE-WAY SNAP-ACTING GAS VALVE

The invention relates to a three-way control valve for a diaphragm operated gas valve, and more specifically, to an improvement over the control valve illustrated in U.S. Pat. No. 3,366,140, in that the construction of the valve is less expensive than that disclosed in the above mentioned patent, both from the standpoint of structural costs as well as of assembly. The improved valve also employs a snap-acting mechanism for actuating the control valve by a bulb and bellows temperature sensing unit rather than an electrically heated bi-metal and room thermostat combination.

FIG. 1 of the drawing is a schematic showing of the invention embodied in a diaphragm operated valve;

FIG. 2 is a cross-sectional view of the control valve similar to the showing in FIG. 1, with the valve in its normal condition and on a larger scale;

FIG. 3 is a fragmentary perspective view of the snap-acting mechanism for actuating the control valve;

FIG. 4 is a perspective view of the control valve supporting arm; and

FIG. 5 is a perspective, cross-sectional and fragmentary view of a portion of the valve housing and the valve seats of the control valve.

Figure 1:
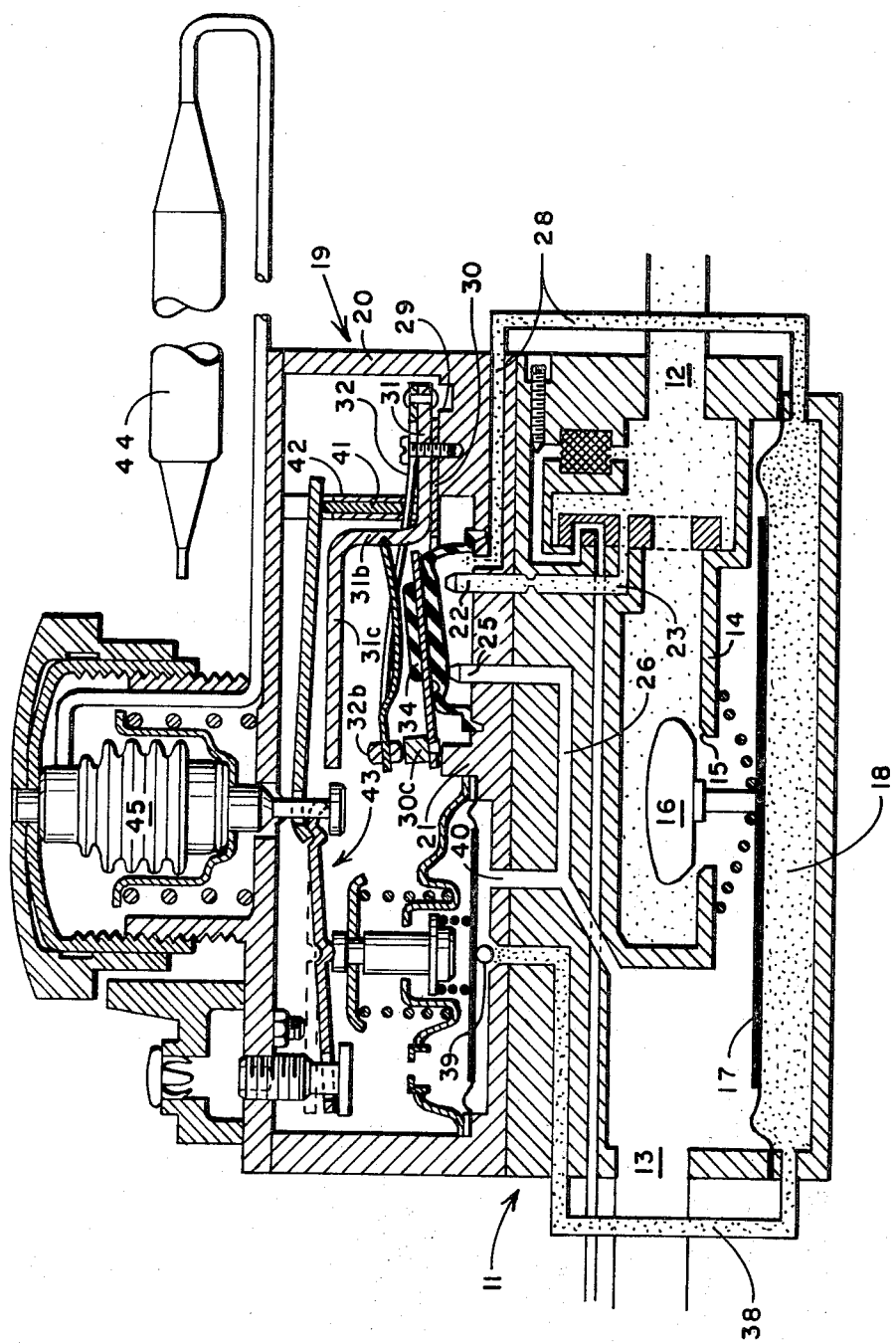

Referring to FIG. 1 of the drawing, the diaphragm gas valve on which the control valve is mounted in generally designated by the reference numeral 11. It has an inlet 12, an outlet 13, and a partition wall 14 therebetween. The wall 14 has an opening providing a valve seat 15 with which a main gas valve 16 cooperates. This valve is connected by a valve stem to a diaphragm 17 which forms a moveable wall of a pressure chamber 18. A valve having this construction is illustrated in U.S. Pat. No. 3,354,901.

The control valve is generally designated by the reference numeral 19 and includes a valve body 20 with a wall 21 adapted to be bolted or otherwise secured to the diaphragm valve 11 for controlling the diaphram valve. An inlet tube 22 extends through the wall 21 in alignment with a gas passageway 23 extending from the inlet 12 to said tube. The upper end of the tube 22 is shaped to provide a valve seat 24. Spaced a short distance from the tube 22 and extending generally parallel therewith is a similar second tube 25 which registers with a passageway 26 extending from the tube to the outlet 13. The upper end of the tube 25 is shaped to provide a valve seat 27. A passageway 28 extends from a point adjacent tube 22 to the pressure chamber 18 of the main diaphragm valve.

Mounted on a boss 29 extending upwardly from the bottom wall 21 of housing 20, is a flexible arm 30, a bracket 31 and a strip 32 of spring material such as steel, all of which are bolted in a stacked arrangement to the boss 29 by means of a bolt 33 (See FIGS. 2 through 5). The arm 30 has a punched out and downwardly inclined tongue or cantilever portion 30a that extends from the free end 30b thereof towards the fixed end thereof. The free end also carries an abutment member 30c. The strip 32 is also riveted to the bracket at its fixed end.

Mounted on the tongue 30a is a valve head 34 that is transversely slotted at 35 and into which the tongue 30a extends, so that the valve head tends to stiffen the tongue 30a and form a relatively stiff valve head assembly (see FIG. 2). The valve head has a peripheral flange portion 36 that is sealingly secured at its periphery 37 to the wall 21 by any suitable means. It is thus seen that the valve head 34 and its flange 36 forms with the upper surface of wall 21 a gas tight chamber into which the two valve seat members 22 and 25 extend. Also, the passageway 28 opens into this chamber so that gas can enter through tube 22, flow through 28 to chamber 18 or from the chamber through tube 25 and passageway 26 to the outlet 13. A branch passageway 38 extends from the pressure chamber 18 past a pressure regulator valve 39 and a branch passageway 40 to passageway 26 and thus to the outlet 13. Diaphragm valve heads are old per se (see U.S. Pat. No. 3,368,582) as are pivoted diaphragms (see U.S. Pat. No. 2,461,615).

The arm 30 is so arranged that the valve head rests on valve seat 24 in its normal condition, but will upon deflection of the free end of the arm towards the valve seats cause the valve head to engage valve seat 27 and pivot about valve seat 27 to raise the valve head off of seat 24. It is thus seen that in the normal condition of the control valve, the valve head 34 seals off the pressure chamber of the diaphragm valve from the flow of inlet gas thereto but upon deflection of the arm, the outlet valve seat 27 is closed and the inlet passageway 22 opened to permit flow of gas from the inlet to the pressure chamber 18 to open valve 16.

The means for actuating the arm 30 is a snap-acting mechanism consisting of a bracket 31 and a resilient arm 32 that has a bowed tongue portion 32a that extends from a point near the free end 32b of the arm 32 to a notch 31a in a vertically extending intermediate portion 31b of the bracket 31. An offset bracket arm 31c limits the upward movement of the strip 32.

The portion 32a exerts a bias on the free end of arm 32 so as to cause the free end to assume a raised position as shown in FIG. 2 or a lowered position as shown in FIG. 1 depending upon whether the intermediate position of arm 32 is above or below the notch in a conventional manner. The arm 32 is adapted to be actuated between its two positions by means of plunger 41 vertically slideable in a guideway 42. The upper end of plunger 41 is adapted to be actuated through a suitable lever arrangement, generally designated by the reference numeral 43, and a bulb 44 and bellows 45 temperature sensing unit, in a conventional manner illustrated in U.S. Pat. No. 3,307,785. As the arm 32 moves from one side to the other of notch 31a under the control of plunger 41, the free end of the lever 32 carrying a double headed abutment member 32b, which engages the abutment 30c, moves valve head 34 with a snap-action. A snap-acting mechanism similar to the one just described is illustrated in U.S. Pat. No. 2,320,535.

The schematic showing of the invention in the diaphragm valve of FIG. 1 of the drawing, illustrates the control valve as being in its energized condition, in response to a call for heat by the temperature sensing bulb and bellows, which causes inlet gas to flow through the passageway 23 valve tube 22 and passageway 28 to the pressure chamber 18, which holds the valve 16 open. In this condition, gas pressure in the outlet 13 acts back through a portion of passageway 26 and passageway 40 to adjust the pressure regulator valve 39 to control the bleeding of gas from pressure chamber 18 through passageway 38. This causes valve 16 to adjust in response to outlet pressure to maintain a uniform outlet pressure. Upon the bulb 44 reaching a temperature which satisfies the area being heated, the fluid in the bellows will expand, operating the lever system to cause the valve 34 to snap to the position shown in FIG. 2. This cuts off inlet supply gas to the chamber 18 and bleeds gas from the pressure chamber 18 through passageway 28, tube 25 and passageway 26 to the outlet, causing quick closing of valve 16.

The embodiments of the invention in which an exclusive property or right is claimed are defined as follows:

1. A three-way valve for controlling the operation of a diaphragm operated gas valve and comprising, a housing, a pair of spaced valve seats, a valve head overlying said seats, a resilient arm fixed at one of its ends to said housing with the other end thereof being free and extending beyond said valve seats, said arm having a cantilever portion thereof overlying said seats and secured to said valve head, a fixed end of said portion being near said other end of said arm and the free end thereof being offset so as to normally hold a first portion of said head in engagement with a first of said seats and a second portion of said head out of engagement with a second of said seats and when the other end of said arm is deflected toward said seats, said second portion of said head engages the second seat and said cantilever portion and head pivots on said second seat to raise said first head portion off of said first seat, and means for deflecting said arm towards said seats.

2. A valve as defined in claim 1 wherein said arm deflecting means is a snap-acting means.

3. The combination of claim 2 wherein said snap-acting means includes a bracket that overlies said arm from the fixed end thereof to an intermediate portion thereof.

4. The combination of claim 3 wherein said valve head has a peripheral flange with the outer edge thereof sealingly engaging said housing to form a gas tight chamber around said valve seats.

5. A valve as defined in claim 1 wherein said valve head has a slot therethrough through which said cantilever portion extends.

* * * * *